(12) United States Patent
Moore

(10) Patent No.: US 7,444,930 B2
(45) Date of Patent: Nov. 4, 2008

(54) AVOCADO DE-SKINNING APPARATUS

(76) Inventor: Richard E. Moore, 1292 Calpella Ct., Chula Vista, CA (US) 91913

( * ) Notice: Subject to any disclaimer, the term of this patent is extended or adjusted under 35 U.S.C. 154(b) by 540 days.

(21) Appl. No.: 11/280,068

(22) Filed: Nov. 16, 2005

(65) Prior Publication Data

US 2007/0110863 A1    May 17, 2007

(51) Int. Cl.
*A23L 1/00* (2006.01)
(52) U.S. Cl. .............................. 99/585; 99/623; 99/628
(58) Field of Classification Search ........... 99/584–589, 99/623–630, 537, 538–541
See application file for complete search history.

(56) References Cited

U.S. PATENT DOCUMENTS

| | | | | |
|---|---|---|---|---|
| 2,500,981 | A | * | 3/1950 | Eymeric ...................... 99/565 |
| 2,659,298 | A | * | 11/1953 | Hudson ..................... 100/98 R |
| 3,351,000 | A | * | 11/1967 | Alexander ................ 100/98 R |
| 3,480,057 | A | * | 11/1969 | Wilhelm .................... 426/287 |
| 3,482,615 | A | | 12/1969 | Green et al. |
| 3,618,651 | A | | 11/1971 | Hart |
| 3,811,000 | A | | 5/1974 | Lazzarini |
| 3,818,821 | A | | 6/1974 | Kendall |
| 3,862,345 | A | | 1/1975 | Westover et al. |
| 3,964,715 | A | | 6/1976 | Burgess |
| 4,355,572 | A | | 10/1982 | Silvestrini |
| 4,600,593 | A | | 7/1986 | Swisher |
| 4,629,629 | A | | 12/1986 | David |
| 4,708,056 | A | | 11/1987 | Dinanath |
| 4,770,887 | A | | 9/1988 | Tarry |
| 5,168,802 | A | | 12/1992 | Silvestrini |
| 6,612,226 | B2 | | 9/2003 | Schrader . |
| 2001/0048960 | A1 | | 12/2001 | Suter |

FOREIGN PATENT DOCUMENTS

JP    06253804    9/1994

* cited by examiner

*Primary Examiner*—Timothy F. Simone
(74) *Attorney, Agent, or Firm*—Frank G. Morkunas

(57) ABSTRACT

An avocado de-skinning apparatus having two generally vertically disposed rotating drums. The rotating drums rotate inward to pinch the skin of an avocado and force the off and through a gap defined between the rotating drums. A driver in the gap and in the upper section of the rotating drums aids in forcing the skin from the avocado and into the gap and through the rear side of the rotating drums. A skin scraper removes any skin adhering to the drums and a pulp scraper retrieves any pulp adhering to the drums for further processing.

5 Claims, 2 Drawing Sheets

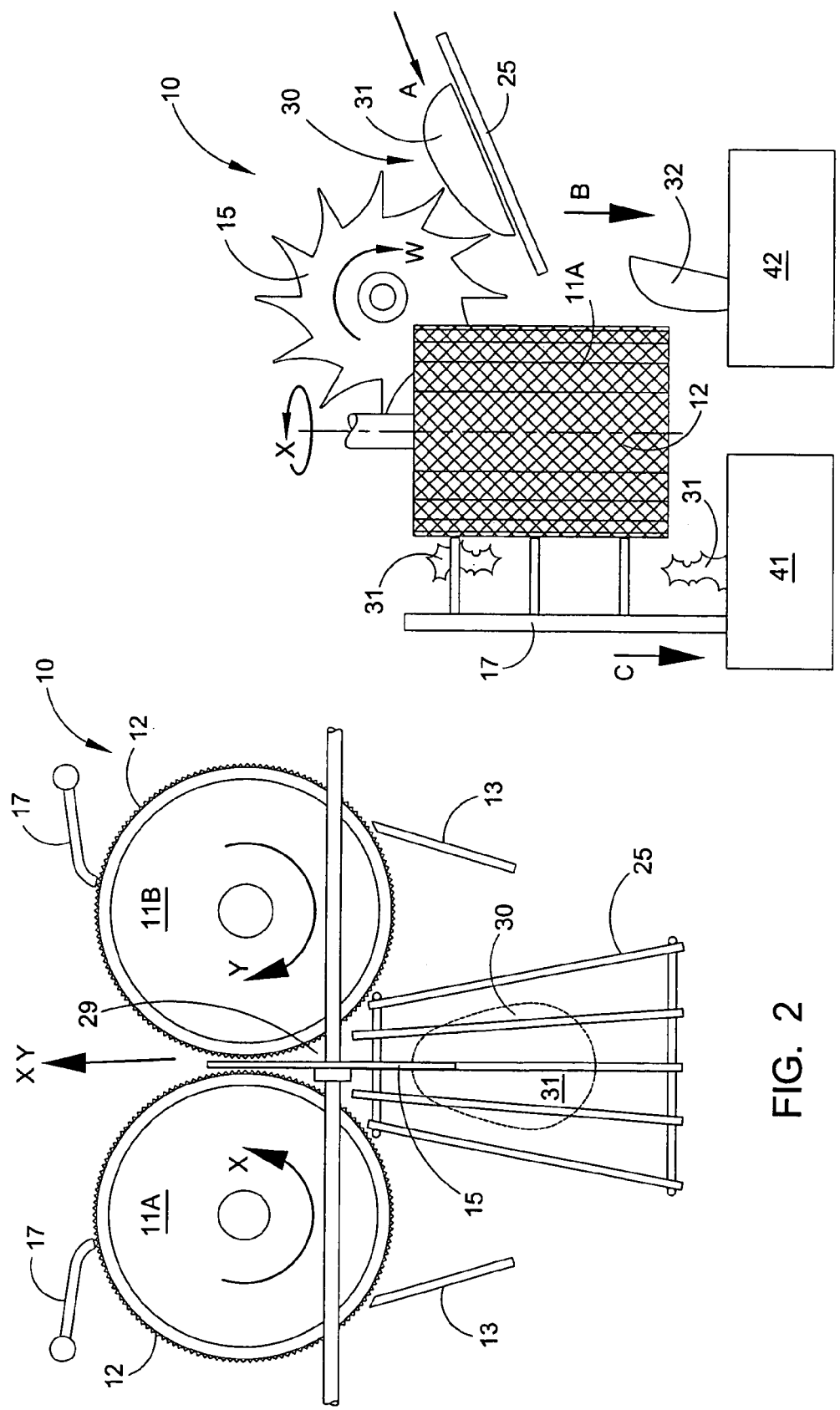

AVOCADO DE-SKINNING APPARATUS

CROSS REFERENCES TO RELATED APPLICATIONS

Not applicable

STATEMENT REGARDING FEDERALLY-SPONSORED RESEARCH OR DEVELOPMENT

Not applicable

BACKGROUND OF THE INVENTION

This present invention relates to an improvement in removing skin and pulp from avocados and more particularly to retrieving more usable pulp from the avocado for processing.

Avocados have become more and more popular for their versatility and arguable health-related benefits. They come in various varieties and sizes. For example, West Indian avocados produce enormous, smooth round, glossy green fruits that are low in oil and can weigh up to two pounds. Guatemalan types produce medium ovoid or pear-shaped, pebbled green fruits that turn blackish-green when ripe. The fruit or pulp of Mexican varieties are smaller (six to ten ounces) with paper-thin skins that turn glossy green or black when ripe.

Regardless the pulp of avocados is deep green near the skin, becoming yellowish nearer the single large, inedible ovoid seed. The pulp is hard when harvested but softens to a buttery texture. Avocados are high in monosaturates and the oil content is second only to olives among fruits. Clinical feeding studies in humans have shown that avocado oil can reduce blood cholesterol.

In many cases, fruits (such as avocados) and vegetables are more easily de-skinned by the heating of these foods. Such heating does not adversely affect the flavor, texture, or appearance of most such foods. Processing avocados by first heating for the purpose of de-skinning them, however, is not nutritionally sound. Avocados are a fruit which is extremely sensitive to heat. This is particularly so in its green (chlorophyll) layer of its pulp as it lies immediately below the skin and, consequently, is subject to greatest heat exposure and nutritional loss and flavor loss. Additionally, avocado skins are particularly thick and/or rough and most processing techniques are manual or if mechanized, the apparatus is expensive, complex, and not as efficient as desired in that usable pulp is lost in the process.

Because of their popularity and growing popularity, and commercialization of avocados, a need exists to effectively and efficiently remove the pulp from an avocado for processing regardless of the size or type of avocado being processed. The prior art has numerous de-skinning or peeling machines and pulp or fruit removal machines which have been cited in this application. Most are extremely complex, somewhat cumbersome, and costly to manufacture and maintain. None is as simple as the presently described apparatus and, in spite of its seeming simplicity, none is as efficient or effective.

The objects of the presently described apparatus are to:

a. effectively and efficiently de-skin an avocado and dispose of the unwanted skin.

b. effectively and efficiently remove the pulp from an avocado and retrieve the pulp for later use.

c. effectively and efficiently remove avocado skin remnants remaining on the apparatus to thereby prevent the skin remnants from mixing with the removed pulp.

d. effectively and efficiently remove pulp remnants remaining on the apparatus to thereby increase the usable volume of pulp.

The foregoing has outlined some of the more pertinent objects of the presently described apparatus. These objects should be construed to be merely illustrative of some of the more prominent features and applications of the intended and presently described apparatus. Many other beneficial results can be attained by applying the presently described apparatus in a different manner or by modifying the presently described apparatus within the scope of the disclosure. Accordingly, other objects and a fuller understanding of the presently described apparatus may be had by referring to the summary and the detailed description of the preferred embodiment in addition to the scope of the presently described apparatus as defined by the claims taken in conjunction with the accompanying drawings.

BRIEF SUMMARY OF THE INVENTION

The above-noted problems, among others, are overcome by the presently described apparatus. Briefly stated, the presently described apparatus contemplates an avocado de-skinner having two generally vertically disposed rotating drums which rotate inward. The rotating drums pinch the skin of an avocado and force it off the avocado and through a gap which is between the rotating drums. A driver in the gap and generally in the upper section of the rotating drums aids in forcing the skin of the avocado into the gap and through the rear side of the rotating drums. A skin scraper at the rear side of the rotating drums removes skin adhering to the drums. A pulp scraper to the front of the skin scraper retrieves any pulp adhering to the drums for further processing.

The foregoing has outlined the more pertinent and important features of the presently described apparatus in order that the detailed description thereof which follows may be better understood so the present contributions to the art may be more fully appreciated. Additional features of the presently described apparatus will be further described hereinafter and which will form the subject of the claims. It should be appreciated by those skilled in the art that the conception and the disclosed specific embodiment may be readily utilized as a basis for modifying or designing other structures and methods for carrying out the same purposes of the presently described apparatus. It also should be realized by those skilled in the art that such equivalent constructions and methods do not depart from the spirit and scope of the presently described apparatus as set forth in the appended claims.

BRIEF DESCRIPTION OF THE DRAWINGS

For a fuller understanding of the nature and objects of the presently described apparatus, reference should be had to the following detailed description taken in conjunction with the accompanying drawings in which:

FIG. 2 is a top plan view of the apparatus.

FIG. 3 is a side, partially schematic, view of the apparatus.

DETAILED DESCRIPTION OF THE INVENTION

Figure 1:
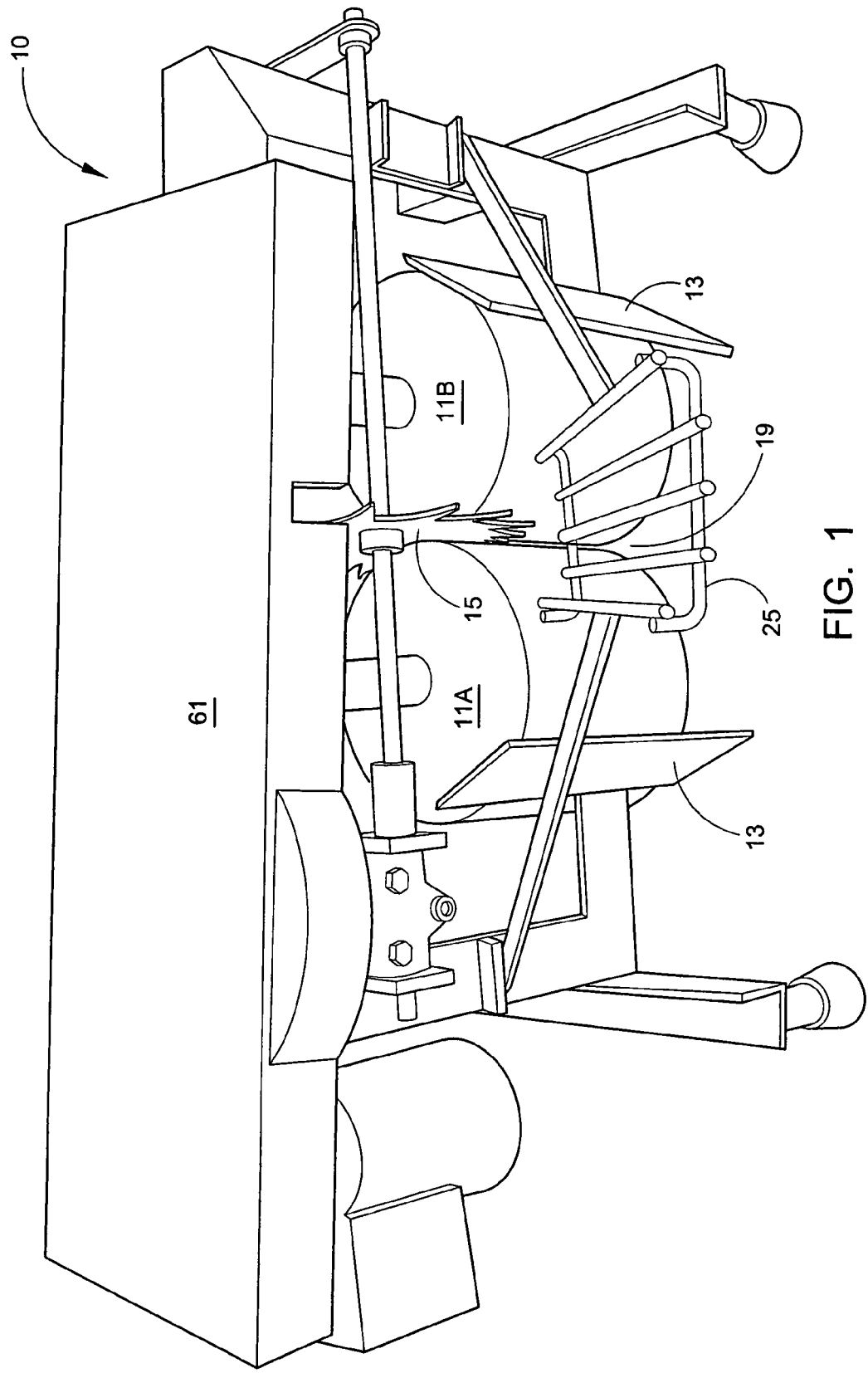
FIG. 1 is perspective view of the apparatus.

Referring now to the drawings in detail and in particular to FIGS. 1 and 2, reference character 10 generally designates an avocado de-skinning apparatus constructed in accordance with a preferred embodiment of the presently described apparatus. Two upstanding, generally vertically disposed, drums 11A, 11B are adjacent to one another but do not touch. A gap 19 is formed at their point of adjacency. The drums 11A, 11B are rotated in tandem in the directions of Arrows X, Y, respectively.

A driver 15 is positioned in the gap 19 at the upper section of each drum. A input member 25 is below the driver 15. The input member 25 terminates at the front of the drums 11A, 11B forming a triangular-like opening or chute 29. An avocado 30 is conveyed to the drums 11A, 11B on or by the input member 25. The input member 25 may convey the avocado 30 by gravity after an avocado has been transported to the input member 25 by external means or the input member 25 itself may be mechanized such as by a conveyor belt. The driver 15 may be a circular-like component with protuberances thereon, such as with fingers, steps, or blades thereon, to force the avocado 30 into the gap 19 and the rotating drums 11A, 11B. FIG. 3 illustrates the movement of an avocado 30 and the processing.

An avocado 30 may be pre-prepared by having been cut in half and the pit may, but need not have been, removed. In the embodiment of the apparatus as illustrated in FIGS. 1-3, the pit should generally be removed prior to the avocado 30 being conveyed to the drums 11A, 11B. As the avocado 30 moving in the direction of Arrow A reaches the terminus of the input member 25, the driver 15, rotating in the direction of Arrow W, comes in contact with the avocado 30 and forces it into the rotating drums 11A, 11B.

A motor 61 with suitable gears and shafts (not shown) are connected to the drums 11A, 11B and driver 15 to effect the rotation of the drums and the driving force of the driver 15.

The driver 15 generally is positioned in the gap 19 and downward into that space and between the drums 11A, 11B. The driver 15 may be down therein to any extent up to its axis of rotation. The driver 15 also may be above the drums 11A, 11B, but the efficiency and effectiveness of the apparatus will be degraded.

For best efficiency, the drums 11A, 11B are roughened or knurled 12. As the avocado 30 is being forced into the gap 19, The rotating knurled drums 11A, 11B grab the skin 31 off the avocado 30 and pull the skin 31 through the rotating drums 11A, 11B, in the direction of Arrow XY until, at the rear of the drums 11A, 11B the skin 31 falls out and down in the direction of Arrow C into a suitable skin disposal unit 41 for ultimate disposition. As the skin 31 is being removed by the gap/drum combination 19, 11A, 11B at the front of the drums 11A, 11B, the pulp 32 falls down the chute 29, in the direction of Arrow B and into a suitable pulp retrieval unit 42.

A skin de-scaler 17, generally a pronged scraper, is located at the rear of each drum 11A, 11B to remove any skin 31 which does not fall down and into the skin disposal unit 41 of its own accord to thereby remove the skin 31 from the surface of the respective drum and allow it to drop into the skin disposal unit 41. Forward of the pronged scraper 17, is a doctor or blade or pulp scraper 13, the purpose of which is to capture and remove any pulp adhering to the respective drum and thereby permit the pulp to fall into the pulp retrieval unit 42.

As configured, the skin disposal unit 41 is below the gap to the rear of the drums 11A, 11B and below the pronged scrapers 17. The pulp retrieval unit 42 is below the gap 19 to the front of the drums 11A, 11B and below the doctor 13.

The gap 19 may be of any width suitable for the intended purpose but a width ranging from approximately 1/12 of an inch to approximately 1/4 of an inch will produce good results but a width range from approximately 1/8 of an inch to approximately 1/6 of an inch will produce better and more effective and efficient results. If the gap 19 is too narrow, part of all of the skin 31 will not be forced through the gap 19. If the gap 19 is too wide, it will cause some or all of the pulp 32 therethrough.

The present disclosure includes that contained in the present claims as well as that of the foregoing description. Although this presently disclosed apparatus has been described in its preferred forms with a certain degree of particularity, it is understood that the present disclosure of the preferred forms has been made only by way of example and numerous changes in the details of construction and combination and arrangement of parts and method steps may be resorted to without departing from the spirit and scope of the presently described apparatus. Accordingly, the scope of the presently described apparatus should be determined not by the embodiments illustrated, but by the appended claims and their legal equivalents.

What is claimed is:

1. An apparatus for removing skin from an avocado leaving its pulp comprising:
    (a) a first drum approximately vertically disposed and rotatable on its axis;
    (b) a second drum, rotatable on its axis, approximately vertically disposed and adjacent to said first drum defining a gap therebetween; wherein said first drum and said second drum each have surfaces which are knurled;
    (c) an input member having a terminus proximal to said first drum and to said second drum and centered approximately on said gap wherein a chute is defined between said terminus and said first drum and said second drum;
    (d) a driver positioned in the gap above and forward of said input member adapted to force the avocado into said gap; and
    (e) at least one motor means for rotating said first drum inward toward said gap, for rotating said second drum inward toward said gap, and for driving said driver to engage the avocado;
    whereby as said first drum and said second drum rotate inward toward said gap they pinch the skin of the avocado forcing the skin off the avocado and through said gap while permitting the pulp to drop through said chute.

2. The apparatus as claimed in claim 1 further comprising at least one pulp scraper on said first drum or on said second drum or on both.

3. The apparatus as claimed in claim 2 further comprising a retrieval means below each said at least one pulp scraper and below said chute for retrieving the pulp.

4. The apparatus as claimed in claim 1 further comprising at least one pronged scraper to the rear of said first drum or to the rear of said second drum or both.

5. The apparatus as claimed in claim 4 further comprising a disposal means for capturing the skin, said disposal means below each of said at least one pronged scraper and below said gap at a point of exit of the skin from said first drum and said second drum.

* * * * *